United States Patent
Inoue et al.

(10) Patent No.: US 9,821,796 B2
(45) Date of Patent: Nov. 21, 2017

(54) HYBRID VEHICLE

(71) Applicant: TOYOTA JIDOSHA KABUSHIKI KAISHA, Toyota-shi, Aichi-ken (JP)

(72) Inventors: Toshio Inoue, Gotenba (JP); Tsukasa Abe, Gotenba (JP); Tomoaki Honda, Gotenba (JP); Keita Fukui, Fujinomiya (JP); Hidekazu Nawata, Gotenba (JP); Taichi Ohsawa, Susono (JP); Yuta Niwa, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/114,917

(22) PCT Filed: Dec. 17, 2014

(86) PCT No.: PCT/JP2014/006304
§ 371 (c)(1),
(2) Date: Jul. 28, 2016

(87) PCT Pub. No.: WO2015/114718
PCT Pub. Date: Aug. 6, 2015

(65) Prior Publication Data
US 2016/0339905 A1    Nov. 24, 2016

(30) Foreign Application Priority Data
Jan. 30, 2014 (JP) .................. 2014-015639

(51) Int. Cl.
*B60W 20/00* (2016.01)
*F01N 3/023* (2006.01)
(Continued)

(52) U.S. Cl.
CPC .............. *B60W 20/16* (2016.01); *B60K 6/26* (2013.01); *B60K 6/445* (2013.01); *B60W 10/02* (2013.01);
(Continued)

(58) Field of Classification Search
CPC ...... B60W 20/16; B60W 10/08; B60W 10/02; B60W 10/06; B60W 2510/0623;
(Continued)

(56) References Cited

U.S. PATENT DOCUMENTS

2014/0121060 A1*  5/2014  Gibson ................. B60W 10/06
                                                   477/181
2017/0120917 A1*  5/2017  Gibson ........... B60W 30/18072

FOREIGN PATENT DOCUMENTS

JP    2007-230475    9/2007
JP    2009-203934    9/2009
(Continued)

*Primary Examiner* — Sherry Estremsky
*Assistant Examiner* — Lillian Nguyen
(74) *Attorney, Agent, or Firm* — Finnegan, Henderson, Farabow, Garrett & Dunner, LLP

(57) ABSTRACT

When reproduction of a filter is required, and a filter temperature is within a first temperature range, an ECU executes a control process including the steps of executing a successive motoring control, determining an intermittent motoring period, an intermittent stopping period, and an intermittence number when the filter temperature is within a second temperature range, and executing an intermittent motoring control.

7 Claims, 6 Drawing Sheets

(51) Int. Cl.
    *B60W 20/16*  (2016.01)
    *B60K 6/445*  (2007.10)
    *B60W 10/06*  (2006.01)
    *B60W 10/08*  (2006.01)
    *B60K 6/26*   (2007.10)
    *B60W 10/02*  (2006.01)
    *F01N 9/00*   (2006.01)
    *F01N 11/00*  (2006.01)
    *F16H 3/72*   (2006.01)

(52) U.S. Cl.
    CPC ............ *B60W 10/06* (2013.01); *B60W 10/08* (2013.01); *F01N 9/002* (2013.01); *F01N 11/002* (2013.01); *F16H 3/727* (2013.01); *B60W 2510/068* (2013.01); *B60W 2510/0623* (2013.01); *B60Y 2300/476* (2013.01); *F01N 3/023* (2013.01); *Y02T 10/54* (2013.01); *Y02T 10/6239* (2013.01); *Y02T 10/6286* (2013.01)

(58) Field of Classification Search
    CPC ........ F01N 9/002; F01N 11/002; F01N 3/023; B60K 6/26; B60K 6/445; F16H 3/727; B60Y 2300/476; Y02T 10/6239; Y02T 10/6286; Y02T 10/54
    See application file for complete search history.

(56) References Cited

FOREIGN PATENT DOCUMENTS

JP     2010-125906     6/2010
JP     2013-75534     4/2013

\* cited by examiner

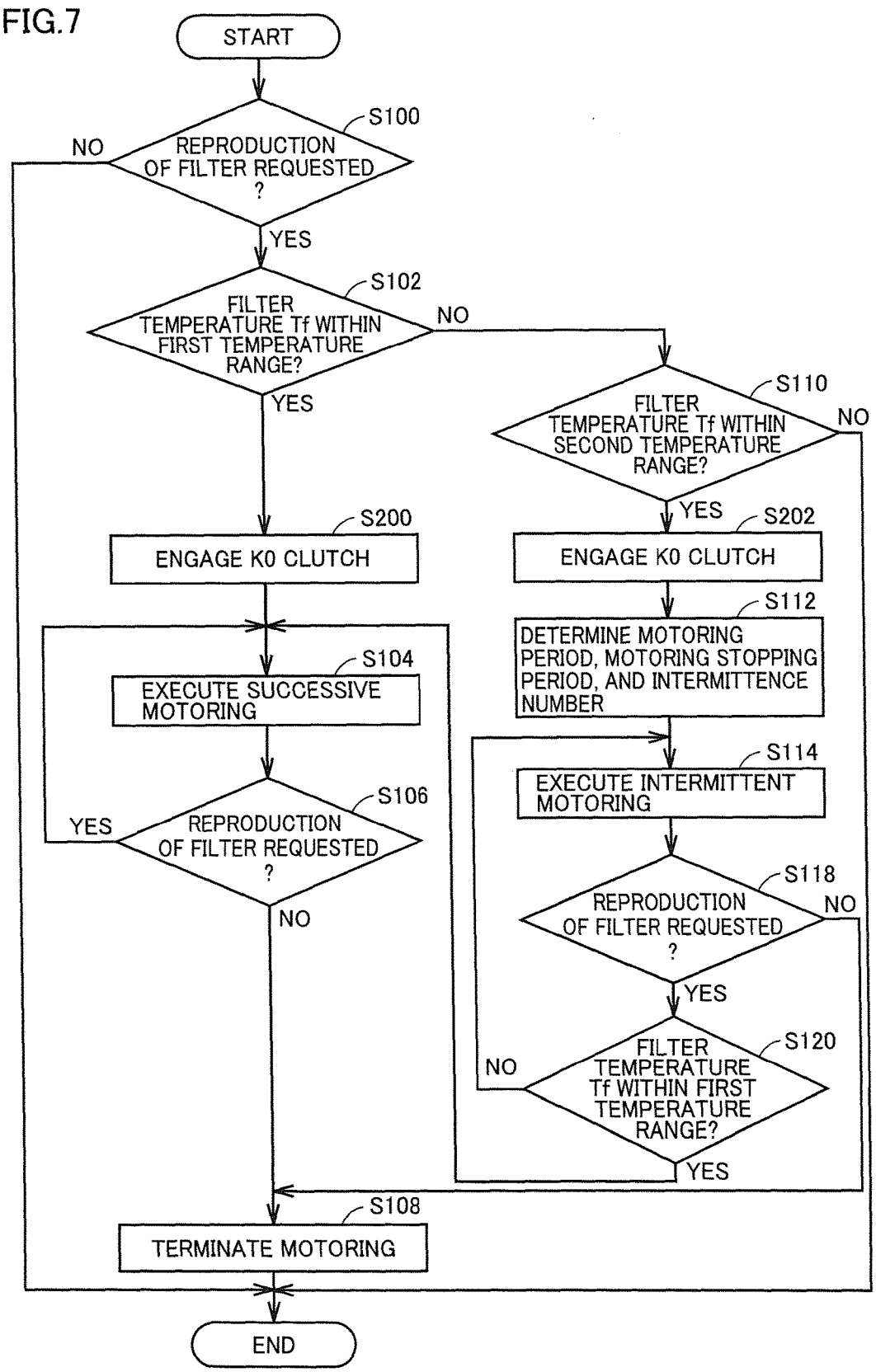

HYBRID VEHICLE

CROSS-REFERENCE TO RELATED APPLICATIONS

This application is a national phase application of International Application No. PCT/JP2014/006304, filed Dec. 17, 2014, and claims the priority of Japanese Application No. 2014-015639, filed Jan. 30, 2014, the content of both of which is incorporated herein by reference.

TECHNICAL FIELD

The present invention relates to a hybrid vehicle having a filter configured to capture particulate matters flowing through an exhaust passage of an engine.

BACKGROUND ART

A hybrid vehicle having an internal combustion engine and a motor is known. The internal combustion engine is, for example, a gasoline engine or a diesel engine. Exhaust gas of these engines contain particulate matters (PM). Therefore, there is a case where a filter such as a DPF (Diesel Particulate Filter) or a GPF (Gasoline Particulate Filter) is provided on an exhaust passage of an engine for the purpose of reducing the PM.

When the PM deposit on these filters, an exhaust gas resistance increases. Therefore, a reproduction control of combusting the PM deposited on the filters with use of exhaust heat or the like of an engine is executed at an appropriate timing.

Moreover, as disclosed in Japanese Patent Laying-Open No. 2009-203934, there has been a known technique of facilitating a reproduction of a filter by rotating an output shaft of an engine with use of a motor and supplying air to the filter to thereby combust the PM described above.

CITATION LIST

Patent Literature

[PTL 1] Japanese Patent Laying-Open No. 2009-203934

SUMMARY OF INVENTION

Technical Problem

However, even when the temperature of the filter is within a reproduction-allowable temperature range, in the case where the operation of rotating the output shaft of the engine with use of the motor and supplying air to the filter is performed at a temperature near a lower limit value of the temperature range, the temperature of the filter may be lowered by the supplied air to be below the lower limit of the reproduction-allowable temperature range.

The present invention was made to solve the problem described above, and its object is to provide a hybrid vehicle capable of reproducing a filter while suppressing lowering of the temperature of the filter.

Solution to Problem

A hybrid vehicle according to one aspect of this invention includes an engine, a rotating electric machine coupled to an output shaft of the engine, a filter configured to capture particulate matters flowing through an exhaust passage of the engine, and a control device configured to control the rotating electric machine such that a first control and a second control are repeated alternately, in a case of reproducing the filter, when a temperature of the filter is lower than a threshold value. The first control rotates the output shaft with use of output torque of the rotating electric machine in a state where a fuel injection is stopped in the engine. The second control stops generation of output torque of rotating electric machine are repeated alternately.

In this way, in the case of reproducing the filter, when the temperature of the filter is lower than the threshold value, even if air containing oxygen is supplied to the filter by the first control of rotating the output shaft of the engine with use of the output torque of the rotating electric machine in the state where the fuel injection is stopped in the engine, an excessive supply of air to the filter can be suppressed by the subsequent second control of stopping generation of output torque of the rotating electric machine. Therefore, lowering of the temperature of the filter can be suppressed. Moreover, alternately repeating the first control and the second control allows air to be supplied to the filter intermittently. Therefore, reproduction of the filter can be facilitated while suppressing lowering of the temperature of the filter.

Preferably, in the case of reproducing the filter, when the temperature of the filter is higher than the threshold value, the control device controls the rotating electric machine to continue the first control until reproduction of the filter is completed.

In this way, when the temperature of the filter is higher than the threshold value, the first control is continued until reproduction of the filter is completed. Accordingly, a large amount of air can be supplied to the filter, so that a combustion of the PM is facilitated, and reproduction of the filter is facilitated to complete reproduction of the filter in an early stage.

More preferably, the threshold value is a value which is higher than a lower limit value of a reproduction-allowable temperature range of the filter.

In this way, in the case of reproducing the filter, when the temperature of the filter is lower than the threshold value, alternately repeating the first control and the second control can suppress lowering of the temperature of the filter. Moreover, in the case of reproducing the filter, when the filter temperature is higher than the threshold value, the first control is continued until reproduction of the filter is completed, so that reproduction can be completed in an early stage.

More preferably, the control device determines at least one of a period of executing the first control and a period of executing the second control based on at least one of a temperature of the filter, an intake air temperature of the engine, and an outside air temperature.

In this way, the period of executing the first control and the period of executing the second control can be determined appropriately based on at least one of the temperature of the filter, the intake air temperature of the engine, and the outside air temperature. Therefore, for example, lowering of the temperature of the filter to be below the lower limit value of the reproduction-allowable temperature range of the filter can be suppressed.

More preferably, the hybrid vehicle further includes an engine control device configured to operate the engine during the period of executing the second control. In this way, the temperature of the filter can be raised by exhaust heat of the engine during the period of executing the second control.

More preferably, the hybrid vehicle further includes a transmission coupling the rotating electric machine and the drive wheels, a clutch provided between the engine and the rotating electric machine and switching a state of the engine and the rotating electric machine from one of a driving power transmitting state and a power shut-off state to the other, and a clutch control device configured to control the clutch so that the state of the engine and the rotating electric machine is rendered to be in the driving power transmitting state in the case of reproducing said filter.

In this way, the present invention can be applied to a vehicle which includes a transmission coupling a rotating electric machine and a drive wheels, and a clutch provided between an engine and a rotating electric machine.

More preferably, the rotating electric machine is a first rotating electric machine. The hybrid vehicle further includes a second rotating electric machine as a driving power source for the vehicle and a planetary gear mechanism coupled to each of the first rotating electric machine, the second rotating electric machine, and the engine.

In this way, the present invention can be applied to a vehicle including a second rotating electric machine as a driving power source and a planetary gear mechanism coupled to each of a first rotating electric machine, a second rotating electric machine, and an engine.

Advantageous Effects of Invention

According to the present invention, in the case of reproducing a filter, when the temperature of the filter is lower than a threshold value, even if air containing oxygen is supplied to the filter by a first control of rotating an output shaft of an engine with use of torque of a rotating electric machine in a state where a fuel injection is stopped in the engine, an excessive supply of air to the filter can be suppressed by a subsequent second control of stopping generation of output torque of the rotating electric machine. Therefore, lowering of the temperature of the filter can be suppressed. Moreover, alternately repeating the first control and the second control allows air to be supplied to the filter intermittently. Therefore, reproduction of the filter can be facilitated while suppressing lowering of the temperature of the filter. Thus, a hybrid vehicle reproducing a filter while suppressing lowering of the temperature can be provided.

BRIEF DESCRIPTION OF DRAWINGS

FIG. 7 is a flowchart representing a control process executed by the ECU in the second embodiment.

DESCRIPTION OF EMBODIMENTS

Figure 1:
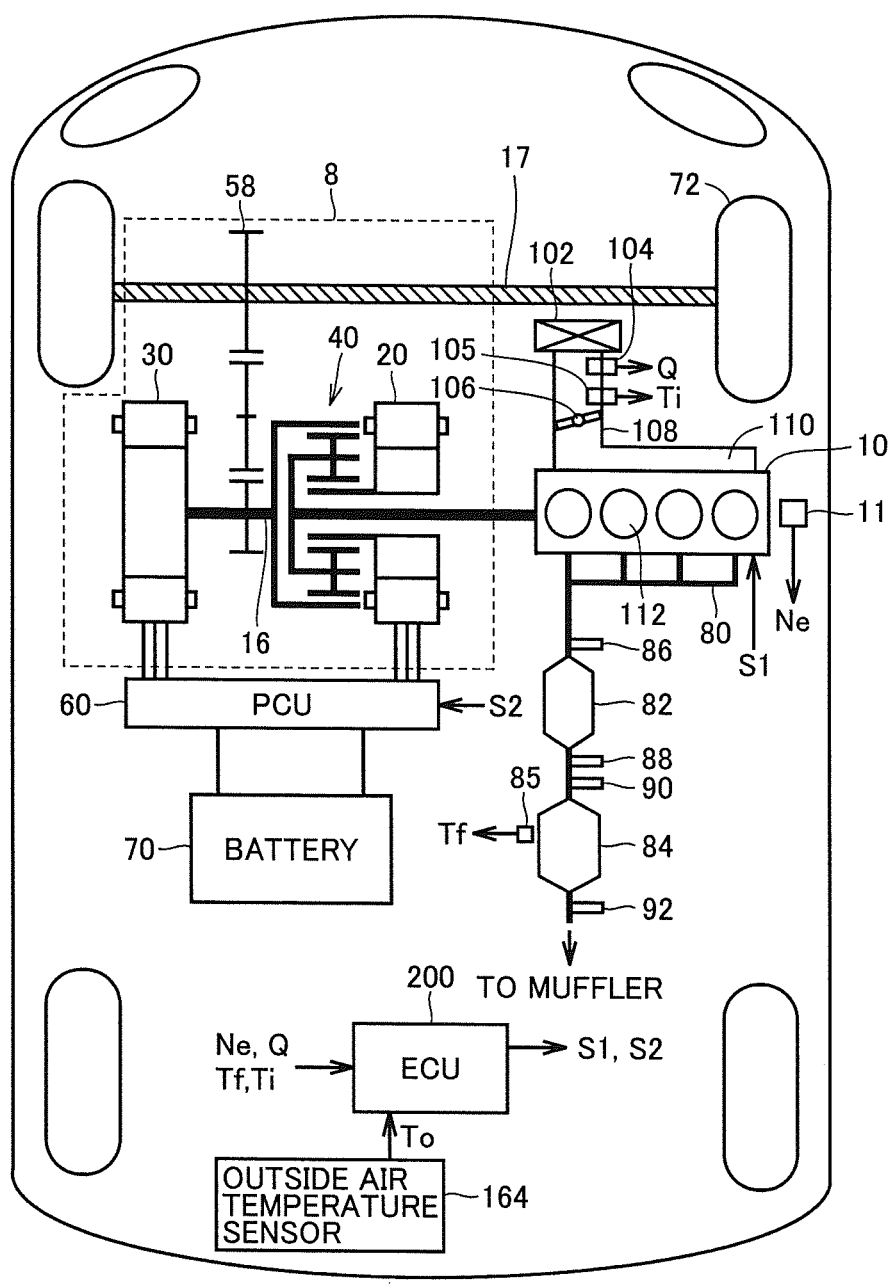
FIG. 1 is an overall block diagram representing a hybrid vehicle according to a first embodiment.

In the following, embodiments of the present invention will be described with reference to the drawings. In the following description, the same parts have the same reference numerals allotted. Their names and functions are the same. Thus, detailed description thereof will not be repeated.

<First Embodiment>

Referring to FIG. 1, an overall block diagram of a hybrid vehicle 1 (in the following, simply referred to as vehicle 1) according to the present embodiment will be described. Vehicle 1 includes a transmission 8, an engine 10, a driving shaft 17, a PCU (Power Control device) 60, a battery 70, drive wheels 72, and an ECU (Electronic Control device) 200.

Transmission 8 includes an output shaft 16, a first motor generator (in the following, referred to as first MG) 20, a second motor generator (in the following, referred to as a second MG) 30, a driving power split device 40, and a reducer 58.

This vehicle 1 travels with use of a driving power outputted from at least one of engine 10 and second MG 30. The driving power generated by engine 10 is split into two paths by driving power split device 40. One path of the two paths is a path for transmitting the driving power of engine 10 to drive wheels 72 through reducer 58. The other path is a path for transmitting driving power of engine 10 to first MG 20.

First MG 20 and second MG 30 are, for example, three-phase alternating-current rotating electric machines. First MG 20 and second MG 30 are driven by PCU 60.

First MG 20 has a function as a generator (power generating device) configured to generate power with use of the driving power of engine 10 split by driving power split device 40 and charge battery 70 through PCU 60. Moreover, first MG 20 receives power from battery 70 and rotates a crankshaft which is an output shaft of engine 10. Accordingly, first MG 20 has a function as a starter configured to start engine 10.

Second MG 30 has a function as a driving motor providing a driving power to drive wheels 72 with use of at least one of the power stored in battery 70 and the power generated by first MG 20. Moreover, second MG 30 has a function as a generator configured to charge battery 70 through PCU 60 with use of power generated by regenerative braking.

Engine 10 is a gasoline engine and is controlled based on a control signal S1 from ECU 200. Engine 10 may be a diesel engine.

In the present embodiment, engine 10 includes four cylinders 112 from a first cylinder to a fourth cylinder. An ignition plug (not illustrated) is provided on top of each of the plurality of cylinders 112.

Engine 10 is not limited to a serial four-cylinder engine as illustrated in FIG. 1. For example, engine 10 may be any of various types of engines including a plurality of cylinders and banks, such as a serial three-cylinder engine, a V-type six-cylinder engine, a V-type eight-cylinder engine, a serial six-cylinder engine, or a horizontally opposed four-cylinder or six-cylinder engine.

Engine 10 is provided with an engine rotational speed sensor 11 configured to detect a rotational speed (in the following, referred to as an engine rotational speed) Ne of the crankshaft (output shaft) of engine 10. Engine rotational speed sensor 11 transmits a signal indicating a detected engine rotational speed Ne to ECU 200.

One end of an intake air passage 108 is coupled to engine 10 through an intake manifold 110. An air cleaner 102 is provided at the other end of intake air passage 108. A throttle valve 106 is provided on the route of intake air passage 108. Between air cleaner 102 and throttle valve 106 on intake air passage 108, there are provided an air flow meter 104 configured to detect an intake air amount Q and an intake air temperature sensor 105 configured to detect an intake air temperature Ti. Air flow meter 104 transmits a signal indicating a detected intake air amount Q to ECU 200. Intake air temperature sensor 105 transmits a signal indicating a detected intake air temperature Ti to ECU 200. Air flow meter 104 and intake air temperature sensor 105 may be provided integrally.

Engine 10 is provided with a fuel injecting device (not illustrated) corresponding to each of the plurality of cylinders 112. The fuel injecting device may be provided in each cylinder of the plurality of cylinders 112 or may be provided in an intake port of each cylinder.

In engine 10 having such a configuration, ECU 200 injects an appropriate amount of fuel to each of the plurality of cylinders 112 at an appropriate timing and stops the injection of fuel to the plurality of cylinders 112 to control a fuel injection amount of each of the plurality of cylinders 112.

An exhaust passage 80 is coupled to engine 10 through an exhaust manifold. In the following, a layout of exhaust passage 80 in the present embodiment will be described.

A catalyst 82 is arranged on exhaust passage 80. Catalyst 82 oxidizes a non-combusted component contained in exhaust gas discharged from engine 10, and reduces the oxidized component. Specifically, catalyst 82 occludes oxygen. In the case where exhaust gas contains non-combusted components such as HC and CO, catalyst 82 oxidizes the non-combusted components with use of the occluded oxygen. Moreover, in the case where exhaust gas contains oxidized components such as NOx, catalyst 82 can reduce the oxidized components and occlude released oxygen. Therefore, catalyst 82 increases a ratio of nitrogen dioxide ($NO_2$) in exhaust gas.

A filter 84 which is a GPF is arranged at a position on a downstream side of catalyst 82 on exhaust passage 80. Filter 84 may have a function similar to that of catalyst 82 as well. In that case, catalyst 82 may be omitted. Moreover, filter 84 may be arranged at a position on an upstream side of catalyst 82 on exhaust passage 80. Filter 84 captures particulate matters (PM) contained in exhaust gas. The captured PM are deposit on filter 84.

An air-fuel ratio sensor 86 is provided at a position on an upstream side of catalyst 82 on exhaust passage 80. Moreover, an oxygen sensor 88 is provided on exhaust passage 80 at a position on a downstream side of catalyst 82 and on an upstream side of filter 84.

Air-fuel ratio sensor 86 is a sensor configured to detect an air-fuel ratio of a mixture of fuel and air supplied to each of the plurality of cylinders 112. Air-fuel ratio sensor 86 detects an air-fuel ratio of exhaust gas and transmits a signal indicating the detected air-fuel ratio to ECU 200.

Oxygen sensor 88 is a sensor configured to detect an oxygen concentration of the mixture of fuel and air supplied to each of the plurality of cylinders 112. Oxygen sensor 88 detects an oxygen concentration in exhaust gas and transmits a signal indicating the detected oxygen concentration to ECU 200. ECU 200 calculates an air-fuel ratio based on the received signal.

Filter 84 is provided with a filter temperature sensor 85 configured to detect a temperature Tf of filter 84 (in the following, referred to as a filter temperature). Filter temperature sensor 85 transmits detected filter temperature Tf to ECU 200. In addition to the detection of filter temperature sensor 85, ECU 200 may estimate filter temperature Tf taking into consideration the intake air temperature, a generated heat amount and a radiated heat amount of engine 10, a radiated heat amount and an exhaust air temperature of exhaust passage 80, or the like.

Moreover, an upstream side pressure sensor 90 is provided on exhaust passage 80 at a position on an upstream side of filter 84 and on a downstream side of oxygen sensor 88. A downstream side pressure sensor 92 is provided at a position on a downstream side of filter 84 on exhaust passage 80.

Both upstream side pressure sensor 90 and downstream side pressure sensor 92 are sensors configured to detect a pressure in exhaust passage 80. Upstream side pressure sensor 90 transmits a signal (first pressure detection signal) indicating a detected pressure in exhaust passage 80 (upstream side pressure) to ECU 200. Downstream side pressure sensor 92 transmits a signal (second pressure detection signal) indicating a detected pressure in exhaust passage 80 (downstream side pressure) to ECU 200.

ECU 200 executes a reproduction control of filter 84 in the case where it is determined that reproduction of filter 84 is required. The reproduction control of filter 84 is a control of raising a filter temperature Tf so that filter temperature Tf falls within a reproduction-allowable temperature (active temperature) range (for example, the range having a lower limit value of a predetermined temperature Tf(0) (for example, about 500° C.)) (in the following, also referred to as a temperature-raising control), stopping the fuel injection in engine 10, and rotating the output shaft of engine 10 with use of output torque of first MG 20 at a predetermined rotational speed to thereby supply air containing oxygen to filter 84, and combust and remove the PM deposited at filter 84. The reproduction control causes the PM deposited at filter 84 to be oxidized by a combustion reaction with $O_2$ and removed from filter 84. In the following description, the operation of stopping the fuel injection in engine 10 and rotating the output shaft of engine 10 with first MG 20 at a predetermined rotational speed is described as "motoring" or "motoring with use of first MG 20" in some cases. The predetermined rotational speed is all necessary to be determined on the standpoint that air with an amount capable of facilitating combustion of the PM can be supplied and that the vibration generated by the motoring is suppressed to a degree of not giving a feeling of discomfort to a passenger, and it is not particularly limited. For example, the rotational speed at the time of motoring may be varied in accordance with a traveling state of a vehicle, or the rotational speed at the time of motoring may be varied in accordance with filter temperature Tf. For example, the rotational speed at the time of motoring can be set higher as filter temperature Tf is lower.

Moreover, at the time of motoring, an opening degree of throttle valve 106 may be, for example, in a fully opened state to reduce the pumping loss, or the opening degree of throttle valve 106 may be changed in accordance with filter temperature Tf. For example, the opening degree of throttle valve 106 may be set smaller as filter temperature Tf is lower.

Also during the execution of the fuel combustion control, in the case where the oxygen component is present in gas flowing through exhaust passage 80, the regeneration control may be executed by combusting and removing the PM deposited at filter 84.

ECU 200 determines that reproduction of filter 84 is required in the case where the PM are deposited at filter 84 to an extent of not causing OT (Over Temperature) due to combustion of the PM. In the present embodiment, ECU 200 determines with use of upstream side pressure sensor 90 and downstream side pressure sensor 92 whether or not reproduction of filter 84 is required.

Specifically, ECU 200 determines that reproduction of filter 84 is required in the case where a difference between an upstream side pressure detected by upstream side pressure sensor 90 and a downstream side pressure detected by downstream side pressure sensor 92 is higher than a threshold value. The threshold value is a value for estimating that a deposited amount of PM at filter 84 is larger than or equal to a predetermined amount, and it may be a predetermined value adapted by experiment or design, or it may be a value varied in accordance with an operating state of engine 10.

The method for determining whether or not reproduction of filter 84 is required is not limited to the method of using upstream side pressure sensor 90 and downstream side pressure sensor 92 described above. The method may be employed in which ECU 200 estimates filter temperature Tf with use of various sensors such as an oxygen sensor, an air-fuel ratio sensor, an air flow meter, a throttle opening degree sensor, and a water temperature sensor, or estimates a deposited amount of PM at filter 84 from an operation history, an operation time, an output lowered amount, or the like of engine 10 to determine that reproduction of filter 84 is required in the case where the estimated deposited amount is larger than or equal to a predetermined amount.

Driving power split device 40 is configured to be able to split driving power generated by engine 10 into a path to driving shaft 17 through output shaft 16 and a path to first MG 20. As driving power split device 40, a planetary gear mechanism having three rotational shafts of a sun gear, a planetary gear, and a ring gear can be used. For example, engine 10, first MG 20, and second MG 30 can be mechanically connected to driving power split device 40 by connecting a rotor of first MG 20 to the sun gear, connecting the output shaft of engine 10 to the planetary gear, and connecting output shaft 16 to the ring gear.

Output shaft 16 also connected to a rotor of second MG 30 is coupled through reducer 58 with driving shaft 17 configured to rotationally drive drive wheels 72. A transmission may be further incorporated between the rotational shaft of second MG 30 and output shaft 16.

PCU 60 converts direct-current power supplied from battery 70 into alternate-current power and drives first MG 20 and second MG 30. Moreover, PCU 60 converts alternate-current power generated by first MG 20 and second MG 30 into direct-current power and charges battery 70. For example, PCU 60 is configured to include an inverter (not illustrated) for DC/AC power conversion and a converter (not illustrated) for executing the direct-current voltage conversion between a direct-current link side of the inverter and battery 70.

Battery 70 is a power storage device, and is a rechargeable direct-current power supply. As battery 70, a rechargeable battery of, for example, nickel hydride, lithium-ion, or the like is used. The voltage of battery 70 is, for example, about 200V. Battery 70 may be charged with use of power generated by first MG 20 and/or second MG 30 as described above, or may be charged with use of power supplied from an external power supply (not illustrated). Battery 70 is not limited to the rechargeable battery. It may be an element capable of generating a direct-current voltage, such as a capacitor, a solar battery, a fuel cell, or the like. A charging device enabling charging of battery 70 with use of an external power supply may be mounted on vehicle 1.

Vehicle 1 is provided with an outside air temperature sensor 164 configured to detect an outside air temperature To. Outside air temperature sensor 164 transmits a signal indicating detected outside air temperature To to ECU 200.

ECU 200 estimates a state of charge (in the following, referred to as SOC) indicating a charging state of battery 70 based on a current, a voltage, and a battery temperature of battery 70. ECU 200 estimates the SOC of battery 70 through, for example, integration of an OCV (Open Circuit Voltage), a charging current, and a discharging current.

ECU 200 calculates a vehicle speed V based on a rotational speed of drive wheels 72 or a rotational speed of second MG 30.

ECU 200 generates a control signal S1 for controlling engine 10, and outputs the generated control signal S1 to engine 10. Moreover, ECU 200 generates a control signal S2 for controlling PCU 60, and outputs the generated control signal S2 to PCU 60.

ECU 200 is a control device configured to control engine 10, PCU 60, and the like to control an entire hybrid system, in other words, charging/discharging states of battery 70 and operating states of engine 10, first MG 20, and second MG 30, to allow vehicle 1 to operate most efficiently.

ECU 200 calculates vehicle requested power corresponding to a stroke amount AP of an accelerator pedal provided at a driver's seat and vehicle speed V. Further, in the case of operating an auxiliary machine, ECU 200 adds power required for operation of the auxiliary machine to the calculated vehicle requested power. The auxiliary machine is, for example, an air-conditioning device. Moreover, in the case of charging battery 70, ECU 200 adds power required for charging the battery to the calculated vehicle requested power. ECU 200 controls torque of first MG 20, torque of second MG 30, or an output of engine 10 in accordance with the calculated vehicle requested power.

In vehicle 1 having such a configuration as described above, in the case where the temperature of filter 84 rises to be within the range of reproduction-allowable temperature range, the PM deposited at filter 84 is combusted, and a source of fire occurs. In such a state, combustion of the PM can be facilitated if an appropriate amount of air is supplied to filter 84. However, even when filter temperature Tf is within the reproduction-allowable temperature range of filter 84, if the operation of stopping the fuel injection and rotating the output shaft of engine 10 with first MG 20 to supply air to filter 84 is performed in the case where filter temperature Tf is close to a lower limit value of the temperature range, excessively supplied air weakens the source of fire at filter 84. Therefore, there is a case where filter temperature Tf is lowered to be below the lower limit value of the reproduction-allowable temperature range. Filter temperature Tf below the lower limit value of the reproduction-allowable temperature range does not facilitate combustion of the PM. Therefore, the temperature rise in filter temperature Tf due to combustion of the reproduced PM at the filter is further lowered.

Therefore, the present embodiment is characterized in that, in the case of reproducing filter 84, when filter temperature Tf is lower than a predetermined temperature Tf(1) which is a threshold value, ECU 200 controls first MG 20 so as to alternately repeat a first control (motoring control) of rotating the output shaft of engine 10 with use of output torque of first MG 20 in the state where the fuel injection is stopped in engine 10, and a second control of stopping generation of output torque of first MG 20. In the following description, the operation of alternately repeating the first control and the second control is described as "intermittent motoring," and the operation of continuing the first control is described as "successive motoring," and the period of executing the first control is described as "motoring period," and the period of executing the second control is described as "motoring stopping period."

Moreover, in the case of reproducing filter 84, when filter temperature Tf is higher than predetermined temperature Tf(1), ECU 200 controls first MG 20 so as to execute the successive motoring until the reproduction of filter 84 is completed.

Further, ECU 200 determines at least any of the motoring period and the motoring stopping period based on at least any one of filter temperature Tf, intake air temperature Ti of engine 10, and outside air temperature To.

Figure 2:
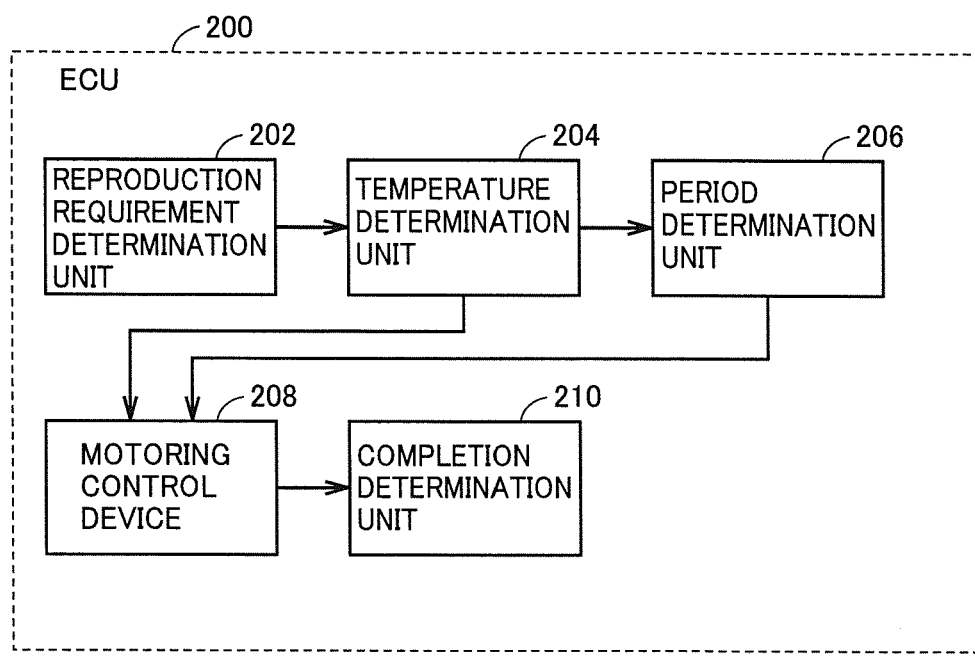
FIG. 2 is a functional block diagram of an ECU.

FIG. 2 is a functional block diagram representing ECU 200 mounted on vehicle 1 according to the present embodiment. ECU 200 includes a reproduction requirement determination unit 202, a temperature determination unit 204, a period determination unit 206, a motoring control device 208, and a completion determination unit 210.

Reproduction requirement determination unit 202 determines whether or not reproduction of filter 84 is required. The method for determining whether or not reproduction of filter 84 is required is as described above. Therefore, detailed description thereof will not be repeated.

Temperature determination unit 204 determines whether or not filter temperature Tf is within a first temperature range which is higher than or equal to predetermined temperature Tf(1), whether or not filter temperature Tf is within a second temperature range of higher than or equal to lower limit value Tf(0) of the reproduction-allowable temperature range and lower than or equal to predetermined temperature Tf(1), or whether or not filter temperature Tf is within a third temperature range of lower than lower limit value Tf(0) of the reproduction-allowable temperature range.

Predetermined temperature Tf(1) is a value which is higher than lower limit value Tf(0) of the reproduction-allowable temperature range of filter 84. Predetermined temperature Tf(1) is set so that filter temperature Tf does not fall below lower limit value Tf(0) of the reproduction-allowable temperature range of filter 84 even in the case where the first control is continued until reproduction of filter 84 is completed.

Period determination unit 206 determines each of the motoring period and the motoring stopping period in the case where reproduction requirement determination unit 202 determines that reproduction of filter 84 is required and temperature determination unit 204 determines that filter temperature Tf is within the second temperature range.

Period determination unit 206 determines the motoring period and the motoring stopping period based on at least any one of, for example, filter temperature Tf (specifically, a difference between a measured value of filter temperature Tf and predetermined temperature Tf(1)), intake air temperature Ti, and outside air temperature To.

Period determination unit 206 may determine the motoring period so that the motoring period is shortened to reduce the lowered amount of filter temperature Tf in the motoring period as at least any one of, for example, filter temperature Tf, intake air temperature Ti, and outside air temperature To is lower.

Moreover, period determination unit 206 may determine the motoring stopping period so that the motoring stopping period lengthened to increase the raised amount of filter temperature Tf in the motoring topping period as at least any one of, for example, filter temperature Tf, intake air temperature Ti, and outside air temperature To is lower.

Period determination unit 206 determines the intermittence number indicating the number of repeating the first control and the second control in the case where the motoring period and the motoring stopping period are determined. Period determination unit 206 determines the supplied amount of air required for combustion of the PM based on, for example, the deposited amount of the PM at filter 84. Period determination unit 206 calculates the period of motoring required for supplying the determined supplied amount. Period determination unit 206 calculates the number of motoring periods so that a sum total of the motoring period exceeds the calculated period of motoring. The intermittence number may be a predetermined value.

In the present embodiment, it is described that period determination unit 206 does not change the motoring period and the motoring stopping period until the motoring period and the motoring stopping period are repeated by the determined intermittence number. However, the motoring period and the motoring stopping period may be changed based on at least any one of filter temperature Tf, intake air temperature Ti, and outside air temperature To for every one intermittent motoring.

Moreover, for example, in the configuration of the hybrid vehicle as shown in FIG. 1, it is desirable that period determination unit 206 determines the motoring period and the motoring stopping period taking into consideration the response of first MG 20 (time for raising the number of rotation to a predetermined number of rotation, or time for having the number of rotation of engine 10 to be zero after generation of output torque of first MG is stopped). For example, it is desirable that the motoring stopping period is set so as to continue the number of rotation of engine 10 (not to be zero) from stopping of generation of output torque of the first MG to the next motoring period. In this way, the rotational speed of engine 10 can be raised to a predetermined rotational speed promptly during the motoring period.

Motoring control device 208 executes the successive motoring in the case where temperature determination unit 204 determines that filter temperature Tf is within the first temperature range. In other words, motoring control device 208 determines the motoring period for supplying a required amount of air for combustion of the PM based on the deposited amount of the PM, and controls first MG 20 so as to perform the motoring with use of first MG 20 until the determined successive motoring period is elapsed. At this time, motoring control device 208 controls engine 10 so as to stop the fuel injection to engine 10.

In the case where reproduction of filter 84 is not required after the elapse of the successive motoring period, motoring control device 208 completes the successive motoring. At this time, motoring control device 208 controls engine 10 so as to resume the fuel injection to engine 10. Moreover, in the case where reproduction of filter 84 is required even after the elapse of the successive motoring period, motoring control device 208 executes the successive motoring again.

In the case where temperature determination unit 204 determines that filter temperature Tf is within the second temperature range, motoring control device 208 executes the intermittent motoring. In other words, motoring control device 208 controls first MG 20 so as to execute the first control in accordance with the motoring period determined by period determination unit 206, execute the second control in accordance with the motoring stopping period, and alternately repeat the first control and the second control by the determined intermittence number.

In the case where reproduction of filter 84 is not required after alternately repeating the first control and the second control by the intermittence number, motoring control device 208 completes the intermittent motoring. At this time, motoring control device 208 controls engine 10 to resume the fuel injection to engine 10. Moreover, in the case where reproduction of filter 84 is required after alternately repeating the first control and the second control by the intermittence number, motoring control device 208 executes the intermittent motoring again.

Completion determination unit 210 determines whether or not the reproduction of filter 84 is completed. Completion determination unit 210 determines whether or not the reproduction of filter 84 is completed with use of upstream side pressure sensor 90 and downstream side pressure sensor 92.

Specifically, completion determination unit 210 determines that the reproduction of filter 84 is completed in the case where a difference between an upstream side pressure detected by upstream side pressure sensor 90 and a downstream side pressure detected by downstream side pressure sensor 92 is lower than a threshold value.

The threshold value used for the determination of whether or not the reproduction of filter 84 is completed may be a predetermined value adapted by experiment or design, or may be a value varied in accordance with an operation state of engine 10.

Moreover, the threshold value used for the determination of whether or not the reproduction of filter 84 is completed may be the value which is the same as the threshold value used for the determination of whether or not the reproduction of filter 84 is required, or may be a value smaller than the threshold value used for the determination of whether or not the reproduction of filter 84 is required.

In the present embodiment, it has been described that motoring control device 208 executes the successive motoring until the successive motoring period is elapsed to thereby execute the successive motoring until the reproduction of filter 84 is completed. However, for example, during the execution of the successive motoring, the successive motoring may be executed until completion determination unit 210 determines that the reproduction of filter 84 is completed.

Figure 3:
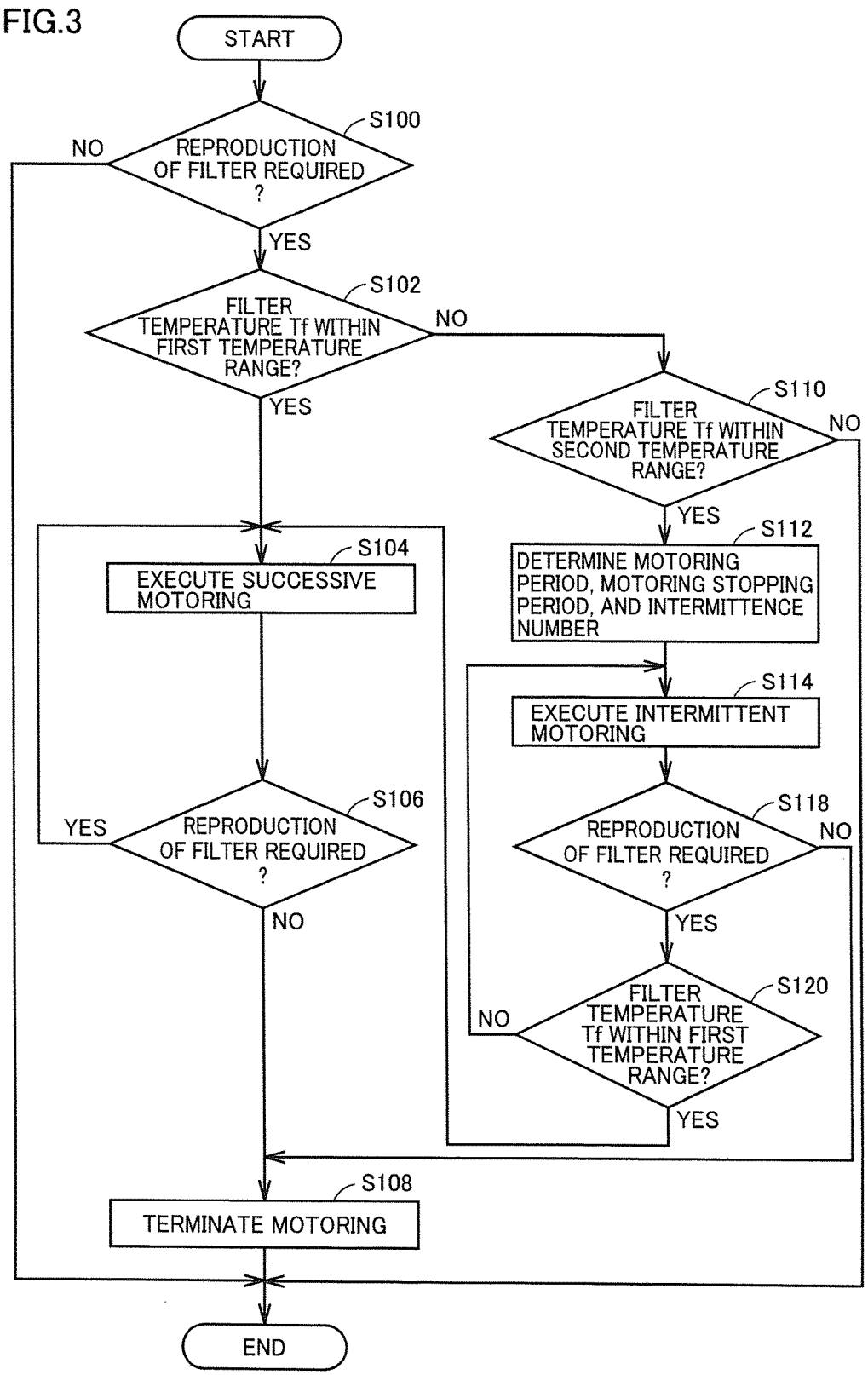
FIG. 3 is a flowchart representing a control process executed by the ECU in the first embodiment.

Referring to FIG. 3, the control process executed by ECU 200 mounted on vehicle 1 according to the present embodiment will be described. For example, ECU 200 executes the following control process after the system of vehicle 1 is started.

In Step (in the following, Step will be described as S) 100, ECU 200 determines whether or not reproduction of filter 84 is required. When it is determined that the reproduction of filter 84 is required (YES in S100), the process proceeds to S102. If not so (NO in S100), this process is terminated. For example, ECU 200 may turn on a reproduction requirement flag in the case where it determines that the reproduction of filter 84 is required.

In S102, ECU 200 determines whether or not temperature Tf is within the first temperature range (in other words, within the range of higher than or equal to predetermined temperature Tf(1)). When it is determined that filter temperature Tf is within the first temperature range (YES in S102), the process proceeds to S104. If not so (NO in S102), the process proceeds to S110. For example, ECU 200 may turn on a first temperature determination flag when filter temperature Tf is within the first temperature range.

In S104, ECU 200 executes the successive motoring. Since the successive motoring is as described above, detailed description thereof will not be repeated. For example, when both the reproduction requirement flag and the first temperature determination flag are in the on state, ECU 200 may execute the successive motoring.

In S106, ECU 200 determines whether or not the reproduction of filter 84 is required. When it is determined that the reproduction of filter 84 is required (YES in S106), the process returns to S104. If not so (NO in S106), the process proceeds to S108.

In S108, ECU 200 terminates the motoring (the successive motoring or the intermittent motoring). In S110, ECU 200 determines whether or not filter temperature Tf is within the second temperature range (in other words, the temperature range which is higher than or equal to lower limit value Tf(0) of the reproduction-allowable temperature range of filter 84 and lower than predetermined temperature Tf(1)). When it is determined that filter temperature Tf is within the second temperature range (YES in S110), the process proceeds to S112. If not so (NO in S110), this process is terminated. For example, when filter temperature Tf is within the second temperature range, ECU 200 may turn on a second temperature determination flag.

In S112, ECU 200 determines the motoring period and the motoring stopping period based on a temperature condition (at least any one of filter temperature Tf, a temperature of intake air, and an outside air temperature).

In S114, ECU 200 executes the intermittent motoring. The intermittent motoring is as described above. Therefore, detailed description thereof will not be repeated. ECU 200 may execute the intermittent motoring when both the reproduction requirement flag and the second temperature determination flag are in the on state.

In S118, ECU 200 determines whether or not the reproduction of filter 48 is required. When it is determined that the reproduction of filter 84 is required (YES in S118), the process proceeds to S118. If not so (NO in S118), the process proceeds to S108. For example, ECU 200 may determine whether or not the reproduction of filter 84 is required after the completion of the motoring (the successive motoring or the intermittent motoring) by motoring control device 208 (in other words, whether or not the reproduction of filter 84 is completed), and turn off the reproduction requirement flag when the reproduction of filter 84 is not required (in other words, when it is determined that the reproduction of filter 84 is completed).

In S120, ECU 200 determines whether or not filter temperature Tf is within the first temperature range. When it is determined that filter temperature Tf is within the first temperature range (YES in S120), the process proceeds to S104. If not so (NO in S120), the process proceeds to S114.

Operation of ECU 200 mounted on vehicle 1 according to the present embodiment based on the structure and the flowchart as illustrated above will be described with reference to FIGS. 4 and 5.

Figure 4:
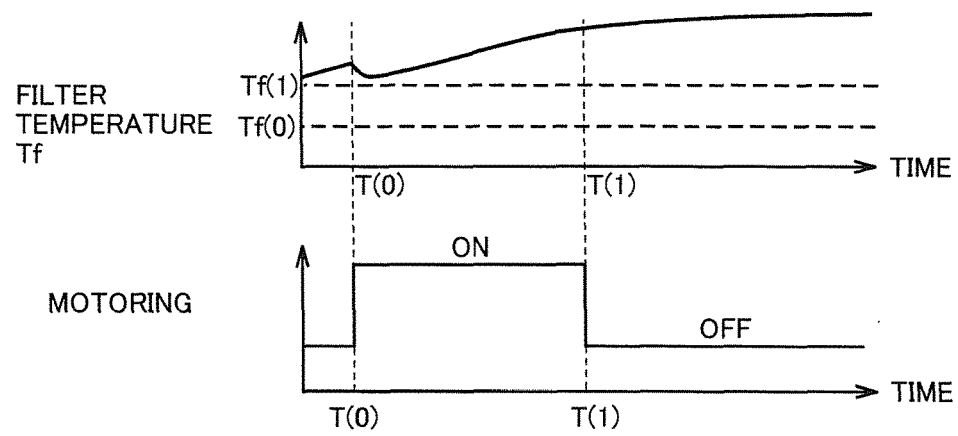
FIG. 4 is a diagram for explanation of a successive motoring control executed in the case where a filter temperature is higher than a predetermined value.

As shown in FIG. 4, at time T(0), when reproduction of filter 84 is required (YES in S100), and filter temperature Tf is within the first temperature range (YES in S102), the successive motoring is executed (S104).

Therefore, the motoring is successively performed from time T(0) to time T(1) at which the successive motoring period is elapsed. Since a large amount of air is supplied to filter 84 by performing the motoring successively, filter temperature Tf is once lowered. However, since the source of fire at filter 84 is strong, combustion of the PM is facilitated by the supply of air, so that the temperature is raised with an elapse of time by the heat of combustion and the like. At filter 84, the deposited amount of the PM is reduced by the combustion of the PM.

At time T(1), if the reproduction of filter 84 is not required (NO in S106), the successive motoring is completed (S108).

Figure 5:
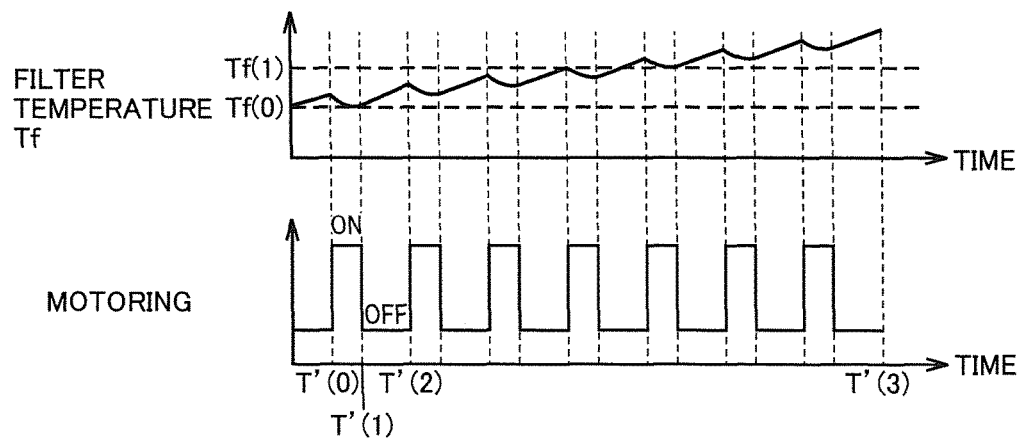
FIG. 5 is a diagram for explanation of an intermittent motoring control executed in the case where a filter temperature is lower than a predetermined value.

On the other hand, as shown in FIG. 5, at time T'(0), when the reproduction of filter 84 is required (YES in S100), and filter temperature Tf is within the second temperature range (NO in S12, and YES in S110), the motoring period, the motoring stopping period, and the intermittence number are determined based on the temperature condition (S112), and the intermittent motoring is executed (S114).

Therefore, the motoring is performed from time T'(0) to time T'(1) at which the determined motoring period is elapsed. After that, the motoring is stopped until time T'(2) at which the motoring stopping period is elapsed, and engine 10 is rendered to be in the operating state. At this time, with the starting of the motoring, a rotational force is given by first MG 20 to the output shaft of engine 10 so that the rotational speed of engine 10 attains a predetermined rotational speed, and generation of output torque of first MG 20 is stopped by stopping the motoring (in other words, a rotational force given to the output shaft of engine 10 is stopped). Such an operation is repeated by the determined intermittence number (in FIG. 5, it is seven times). During the motoring period of executing the first control, when air is supplied to filter 84, filter temperature Tf is lowered. However, since the supply of air to filter 84 is stopped during the subsequent motoring stopping period of executing the second control, and engine 10 attains the operating state, exhaust heat of engine 10 raises the temperature of filter 84. Since alternately repeating the first control and the second control in such a manner suppresses an excessive supply of air to filter 84, weakening of the source of fire at filter 84 is suppressed. Since the rising amount of filter temperature Tf during the motoring stopping period is greater than the lowering amount of filter temperature Tf during the motoring period, filter temperature Tf rises with an elapse of time by repeating the increase and decrease. Consequently, lowering of filter temperature Tf to be below the lower limit value of the reproduction-allowable temperature range is suppressed. Therefore, since the combustion of the PM is facilitated, the deposited amount of PM is reduced at filter 84.

At time T'(3) after the repetition by the determined intermittence number, when the reproduction of filter 84 is not required (NO in S116), the intermittent motoring is completed (S108).

Moreover, at time T'(3), when the reproduction of filter 84 is required (YES in S116), and filter temperature Tf is raised to be within the first temperature range (YES in S118), the successive motoring is executed (S104). If filter temperature Tf remains in the second temperature range (NO in S118), the intermittent motoring is executed (S114).

In such a manner as described above, according to the hybrid vehicle of the present embodiment, in the case of reproducing filter 84, even when filter temperature Tf is lower than predetermined temperature Tf(1), and air containing oxygen is supplied to filter 84 by the first control of rotating the output shaft of engine 10 with use of output torque of first MG 20 in the state where the fuel injection is stopped in engine 10, an excessive supply of air to filter 84 can be suppressed by the subsequent second control of stopping generation of output torque of first MG 20, so that lowering of filter temperature Tf can be suppressed. Moreover, since air can be supplied to filter 84 intermittently by alternately repeating the first control and the second control, reproduction of the filter can be facilitated while suppressing lowering of filter temperature Tf. Thus, a hybrid vehicle can be provided which reproduces a filter while suppressing lowering of the temperature of the filter.

Further, in the case of reproducing filter 84, when filter temperature Tf is higher than or equal to predetermined temperature Tf(1), ECU 200 controls first MG 20 to continue the first control until the reproduction of filter 84 is completed. Accordingly, since a large amount of air can be supplied to filter 84, reproduction of the filter can be completed in an early stage by facilitating the combustion of the PM to facilitate the reproduction of filter 84.

Further, since ECU 200 can appropriately determine the motoring period and the motoring stopping period by determining at least any one of the motoring period and the motoring stopping period based on at least any one of filter temperature Tf, intake air temperature Ti of engine 10, and outside air temperature To, lowering of filter temperature Tf to be below the lower limit value of the reproduction-allowable temperature range of filter 84 can be suppressed, for example, by executing the intermittent motoring.

ECU 200 may determine the successive motoring period based on at least any one of filter temperature Tf, intake air temperature Ti of engine 10, and outside air temperature To.

Further, ECU 200 can raise filter temperature Tf with use of exhaust heat of engine 10 during the motoring stopping period by operating engine 10 during the motoring stopping period.

When it is determined that filter temperature Tf is not within either the first temperature range or the second temperature range (in other words, when it is determined that filter temperature Tf is within the third temperature range), ECU 200 may execute the temperature raising control of raising filter temperature Tf to be higher than at least lower limit value Tf(0) of the reproduction-allowable temperature range, or may await until filter temperature Tf is raised by exhaust heat of engine 10 to be higher than lower limit value Tf(0) of the reproduction-allowable temperature range.

In the present embodiment, it has been described that, for example, assuming that engine 10 is operating, in the case where reproduction of filter 84 is required, when filter temperature Tf is within the second temperature range, the fuel injection to engine 10 is stopped and the motoring is performed during the motoring period, and the motoring is stopped and engine 10 is operated during the motoring stopping period. However, for example, in the case where reproduction of filter 84 is required during EV traveling of allowing vehicle 1 to travel only with second MG 30 as a driving source in the state where the fuel injection to engine 10 is stopped, and when filter temperature Tf is within the second temperature range, the intermittent motoring may be executed. In this case, during the motoring stopping period, a stopped state of the fuel injection to engine 10 may be maintained, or engine 10 may be operated.

In the present embodiment, it has been described that the motoring period and the motoring stopping period are determined so that filter temperature Tf increases along with an elapse of time while repeating increase and decrease of filter temperature Tf by the intermittent motoring. However, for example, the motoring period and the motoring stopping period may be determined so that filter temperature Tf repeats increase and decrease by the intermittent motoring to increase and decrease within a predetermined temperature range or around a predetermined target temperature (for example, predetermined temperature Tf(1)).

<Second Embodiment>

In the following, a hybrid vehicle according to the second embodiment will be described. Vehicle 1 according to the present embodiment is different in a drive system of vehicle 1 and operation of ECU 200 as compared to the configuration of vehicle 1 according to the first embodiment described above. Other configuration is the same as the configuration of vehicle 1 according to the first embodiment described above. They have the same reference numerals allotted. Functions of those are also the same. Thus, detailed description thereof will not be repeated.

Figure 6:
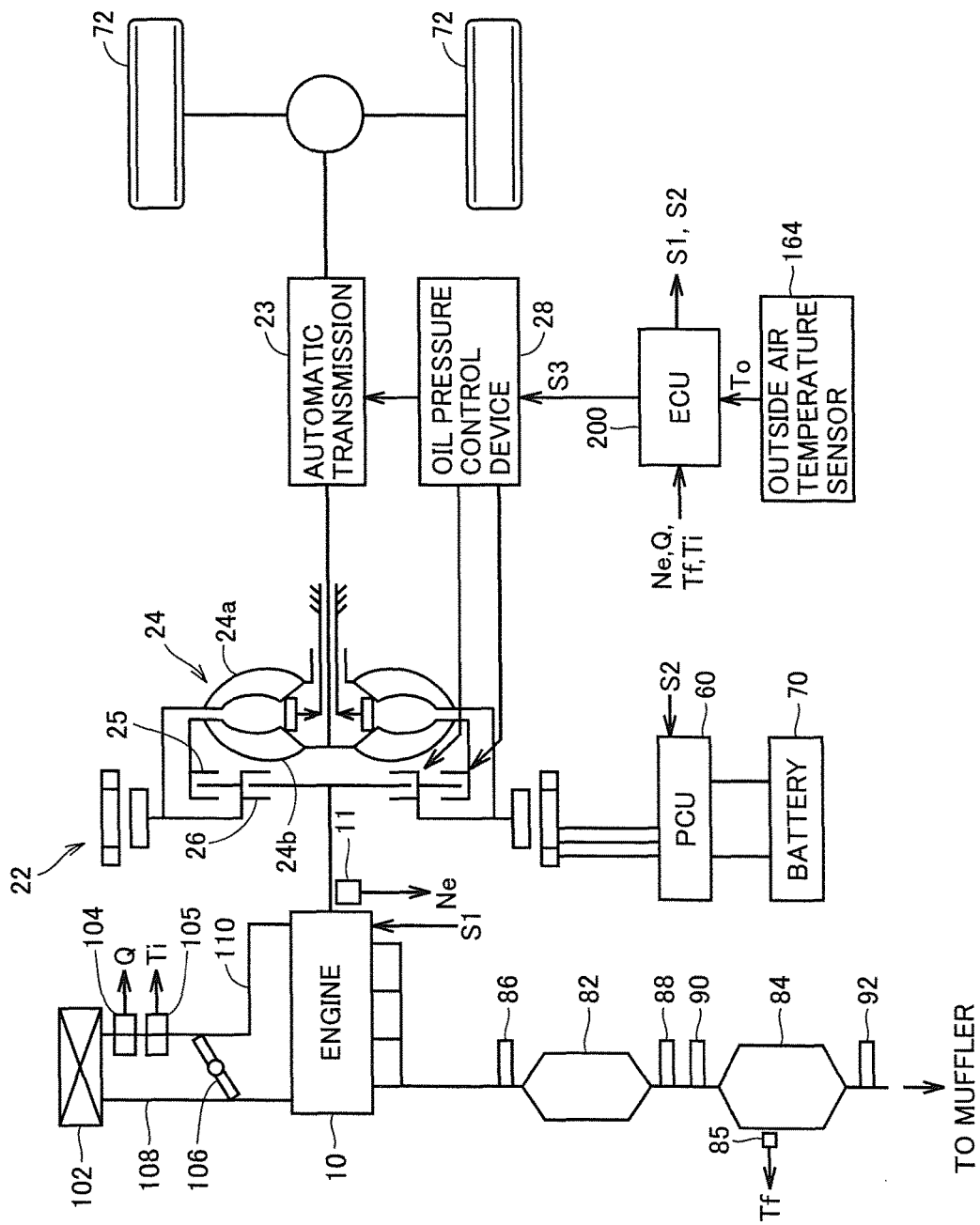
FIG. 6 is an overall block diagram representing a hybrid vehicle according to a second embodiment.

As shown in FIG. 6, vehicle 1 according to the present embodiment includes an engine 10, a motor generator 22 (in the following, described as MG22), an automatic transmission 23, a torque converter 24, drive wheels 72, and an oil pressure control device 28.

A K0 clutch 26 is provided between an output shaft of engine 10 and an output shaft of MG 22. K0 clutch 26 switches from any one of a power transmitting state and a power shutting state to the other between the output shaft of engine 10 and the output shaft of MG 22.

Torque converter 24 includes a pump impeller 24a coupled to an output shaft of MG 22 and a turbine impeller 24b coupled to an input shaft of the automatic transmission. A stator is provided between pump impeller 24a and turbine impeller 24b. The input shaft and output shaft of torque converter 24 are synchronized in rotation by a lock-up clutch 25 attaining an engaged state, and the synchronization of the rotation is cancelled by lock-up clutch 25 attaining a released state.

Automatic transmission 23 may be a stepped variable automatic transmission or a continuously variable transmission (CVT).

Oil pressure control device 28 includes a solenoid valve, a valve configured to switch oil passages, or the like, and controls an oil pressure supplied to lock-up clutch 25 (an engaging force of lock-up clutch 25) and an oil pressure supplied to K0 clutch 26 (an engaging force of K0 clutch 26) based on, for example, a control signal S3 from ECU 200.

Moreover, oil pressure control device 28 controls a transmission gear ratio of automatic transmission 23 based on control signal S3 from ECU 200.

Referring to FIG. 7, the control process executed by ECU 200 mounted on vehicle 1 according to the present embodiment will be described.

The processes of S200 and S100 to S118 of the flowchart shown in FIG. 7 are the same as the processes of S100 to S118 of the flowchart shown in FIG. 3. Therefore, detailed description thereof will not be repeated.

When it is determined that filter temperature Tf is within the first temperature range (YES in S102), ECU 200 controls in S200 the engaging force of K0 clutch 26 so that K0 clutch 26 attains the engaged state (on state). After that, ECU 200 allows the process to proceed to S104.

When it is determined that filter temperature Tf is within the second temperature range (YES in S110), ECU 200 controls in S202 the engaging force of K0 clutch 26 so that K0 clutch 26 attains the engaged state (on state). After that, ECU 200 allows the process to proceed to S112.

The operation of ECU 200 mounted on vehicle 1 according to the present embodiment based on the structure and the flowchart illustrated above will be described.

When the reproduction of filter 84 is required (YES in S100), and filter temperature Tf is within the first temperature range (YES in S102), the engaging force of K0clutch 26 is controlled so that K0 clutch 26 attains the engaged state (S200), and the successive motoring is executed (S104).

Therefore, the motoring is performed successively until the successive motoring period is elapsed. Since a large amount of air is supplied to filter 84 by successively performing the motoring, filter temperature Tf is lowered once. However, as the combustion of the PM is facilitated by the supply of air, the temperature of filter 84 is raised by the heat of combustion and the like along with an elapse of time. At filter 84, the deposited amount of PM is reduced by the combustion of PM.

After an elapse of the successive motoring period, if the reproduction of filter 84 is not required (NO in S106), the successive motoring is completed (S108).

On the other hand, when the reproduction of filter 84 is required (YES in S100), and filter temperature Tf is within the second temperature range (NO in S102, and YES in S110), the engaging force of K0 clutch 26 is controlled so that K0 clutch 26 attains the engages state (S202), and the motoring period, the motoring stopping period, and the intermittence number are determined based on the temperature condition (S112), and the intermittent motoring is executed (S114).

Therefore, the motoring is performed until the determined motoring period is elapsed, and thereafter the motoring is stopped until the motoring stopping period is elapsed, and engine 10 attains the operating state. At this time, a rotational force by first MG 20 is given to the output shaft of engine 10 so that the rotational speed of engine 10 attains the predetermined rotational speed upon starting of the motoring, and generation of output torque of first MG 20 is stopped by stopping of the motoring (in other words, the rotational force given to the output shaft of engine 10 is stopped). Such operation is repeated by the determined intermittence number. During the motoring period of executing the first control, filter temperature Tf is lowered when air is supplied to filter 84. However, the supply of air to filter 84 is stopped during the subsequent motoring stopping period of executing the second control, and engine 10 attains the operating state, so that exhaust heat and the like of engine 10 raises the temperature of filter 84. Since the excessive supply of air to filter 84 is suppressed by alternately repeating the first control and the second control in such a manner, weakening of the source of fire at filter 84 is suppressed. Since the raising amount of filter temperature Tf during the motoring stopping period is greater than the lowering amount of filter temperature Tf during the motoring period, filter temperature Tf rises with an elapse of time while repeating the increase and decrease. Consequently, lowering of filter temperature Tf to be below the lower limit value of the reproduction-allowable temperature span is suppressed. Accordingly, since the combustion of PM is facilitated, the deposited amount of PM at filter 84 is reduced.

After the repeating by the determined intermittence number, if the reproduction of filter 84 is not required (NO in S116), the intermittent motoring is completed (S108).

In the manner as described above, according to the hybrid vehicle according to the present embodiment, in the case of reproducing filter 84, even when filter temperature Tf is lower than predetermined temperature Tf(1), and K0 clutch 26 attains the engaging state, and air containing oxygen is supplied to filter 84 by the first control of rotating the output shaft of engine 10 with use of output torque of first MG 20 in the state where the fuel injection is stopped in engine 10, an excessive supply of air to filter 84 by the subsequent second control of stopping generation of the output torque of first MG 20 can be suppressed, so that lowering of filter temperature Tf can be suppressed. Moreover, since air can be supplied intermittently to filter 84 by alternately repeating the first control and the second control, reproduction of the filter can be facilitated while suppressing lowering of filter temperature Tf. Thus, a hybrid vehicle can be provided which reproduces a filter while suppressing the temperature of the filter.

The configuration of the hybrid vehicle to which the present invention is applied is not particularly limited to the configuration of the hybrid vehicle described in the first embodiment or to the configuration of the hybrid vehicle described in the second embodiment. For example, the hybrid vehicle may have the configuration in which the output shaft of the engine as a main driving power and drive wheels are coupled through a transmission, and the output of the engine is assisted by a motor as an auxiliary driving power.

Alternatively, the hybrid vehicle may have a configuration in which the engine and the first motor generator are coupled, and the second motor generator and the drive wheels are coupled, and the engine and the drive wheels are coupled through the clutch.

In the hybrid vehicle having such a configuration, for example, allowing the clutch to attain the state of shutting between the engine and the drive wheels makes it possible to perform a series operation of supplying power generated by the first motor generator with an engine as a drive power source to the second motor generator, or a parallel operation of allowing the clutch to attain the state of transmitting power between the engine and the drive wheels to have the engine and the second motor generator as drive power sources.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 1 hybrid vehicle; 8 transmission; 10 engine; 11 engine rotational speed sensor; 16 output shaft; 17 driving shaft; 20, 22, 30 MG; 23 automatic transmission; 24 torque converter; 24a pump impeller; 24b turbine impeller; 25 lock-up clutch; 26 clutch k0; 28 oil pressure control device; 40 driving power split device; 58 reducer; 60 PCU; 70 battery; 72 drive wheels; 80 exhaust passage; 82 catalyst; 84 filter; 85 filter temperature sensor; 86 air-fuel ratio sensor; 88 oxygen sensor; 90 upstream side pressure sensor; 92 downstream side pressure sensor; 102 air cleaner; 104 air flow meter; 105 intake air temperature sensor; 106 throttle valve; 108 intake air passage; 110 intake manifold; 112 cylinder; 164 outside air temperature sensor; 200 ECU; 202 reproduction requirement determination unit; 204 temperature determination unit; 206 period determination unit; 208 motoring control device; 210 completion determination unit.

The invention claimed is:

1. A hybrid vehicle, comprising:
   an engine;
   a rotating electric machine coupled to an output shaft of the engine;
   a filter configured to capture particulate matters flowing through an exhaust passage of the engine;
   a control device configured to control the rotating electric machine such that a first control and a second control are repeated alternately, in a case of reproducing the filter, when a temperature of the filter is lower than a threshold value, the first control rotating the output shaft with use of output torque of the rotating electric machine in a state where a fuel injection is stopped in the engine, the second control stopping generation of output torque of the rotating electric machine.

2. The hybrid vehicle according to claim 1, wherein in the case of reproducing the filter, when the temperature of the filter is higher than the threshold value, the control device controls the rotating electric machine to continue the first control until reproduction of the filter is completed.

3. The hybrid vehicle according to claim 1, wherein the threshold value is a value which is higher than a lower limit value of a reproduction-allowable temperature range of the filter.

4. The hybrid vehicle according to claim 1, wherein the control device determines at least one of a period of executing the first control and a period of executing the second control based on at least one of a temperature of the filter, an intake air temperature of the engine, and an outside air temperature.

5. The hybrid vehicle according to claim 1, wherein
   the hybrid vehicle further comprises an engine control device configured to operate the engine during the period of executing the second control.

6. The hybrid vehicle according to claim 1, further comprising:
   a transmission coupling the rotating electric machine and the drive wheels;
   a clutch provided between the engine and the rotating electric machine and switching a state of the engine and the rotating electric machine from one of a driving power transmitting state and a power shutting state to the other; and
   a clutch control device configured to control the clutch so that the state of the engine and the rotating electric machine is rendered to be in the driving power transmitting state in the case of reproducing the filter.

7. The hybrid vehicle according to claim 1, wherein
   the rotating electric machine is a first rotating electric machine, and
   the hybrid vehicle further comprises:
   a second rotating electric machine as a driving power source for the hybrid vehicle; and
   a planetary gear mechanism coupled to each of the first rotating electric machine, the second rotating electric machine, the engine.

* * * * *